US012761012B2

(12) United States Patent
Seo et al.

(10) Patent No.: US 12,761,012 B2
(45) Date of Patent: Oct. 13, 2026

(54) MEASURING PARALLELISM

(71) Applicant: SAMSUNG ELECTRONICS CO., LTD., Suwon-si (KR)

(72) Inventors: Minhwan Seo, Suwon-si (KR); Jiyoung Chu, Suwon-si (KR); Hyungjin Kim, Suwon-si (KR); Sangwoo Bae, Suwon-si (KR); Seungyeol Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

(21) Appl. No.: 18/620,802

(22) Filed: Mar. 28, 2024

(65) Prior Publication Data

US 2025/0052559 A1 Feb. 13, 2025

(30) Foreign Application Priority Data

Aug. 11, 2023 (KR) ........................ 10-2023-0105891

(51) Int. Cl.
*G01B 9/02015* (2022.01)
*G01B 9/02001* (2022.01)
(Continued)

(52) U.S. Cl.
CPC ...... *G01B 9/02016* (2013.01); *G01B 9/02011* (2013.01); *G01B 11/26* (2013.01); *G01B 11/272* (2013.01); *G02B 21/0016* (2013.01); *G02B 21/0092* (2013.01); *G02B 21/361* (2013.01); *G02B 27/10* (2013.01); *G02B 27/28* (2013.01); *G01B 2210/46* (2013.01); *G02B 27/283* (2013.01); *G02B 27/286* (2013.01)

(58) Field of Classification Search
CPC ........... G01B 9/02016; G01B 9/02011; G01B 11/26; G01B 11/272; G01B 2210/46; G02B 21/0016; G02B 21/0092; G02B 21/361; G02B 27/10; G02B 27/28; G02B 27/283; G02B 27/286
See application file for complete search history.

(56) References Cited

U.S. PATENT DOCUMENTS 8,875,979 B2 11/2014 Yung et al.
9,283,720 B2 3/2016 Minoda et al.
(Continued)

FOREIGN PATENT DOCUMENTS

JP 2011149776 A * 8/2011
KR 20230052969 4/2023

OTHER PUBLICATIONS

Fendler et al., "Technological and Electrical Performances of Ultrafine-Pitch Flip-Chip Assembly Based on Room-Temperature Vertical Interconnection," IEEE Transactions on Components, Packaging and Manufacturing Technology, Mar. 2011, 1(3):291-298.

*Primary Examiner* — Tarifur R Chowdhury
*Assistant Examiner* — Kaitlyn E Kidwell
(74) *Attorney, Agent, or Firm* — Fish & Richardson P.C.

(57) ABSTRACT

A parallelism measurement optical system module includes a polarization beam splitter, a mirror positioned on a first surface of the polarization beam splitter, a first quarter wave plate positioned on a second surface of the polarization beam splitter that is perpendicular to the first surface, and a second quarter wave plate positioned on a third surface of the polarization beam splitter that is perpendicular to the first surface and parallel to the second surface.

20 Claims, 13 Drawing Sheets

(51) Int. Cl.

| | |
|---|---|
| ***G01B 11/26*** | (2006.01) |
| ***G01B 11/27*** | (2006.01) |
| ***G02B 21/00*** | (2006.01) |
| ***G02B 21/36*** | (2006.01) |
| ***G02B 27/10*** | (2006.01) |
| ***G02B 27/28*** | (2006.01) |

(56) References Cited

U.S. PATENT DOCUMENTS

| | | | | |
|---|---|---|---|---|
| 9,425,163 | B2 | 8/2016 | Schmidt-Lange et al. | |
| 11,062,964 | B2 | 7/2021 | Seyama | |
| 2007/0064240 | A1* | 3/2007 | Hill | G01B 11/272 356/487 |
| 2021/0351057 | A1 | 11/2021 | Tamura | |
| 2022/0285196 | A1 | 9/2022 | Yamasaki et al. | |
| 2023/0000343 | A1 | 1/2023 | Kim et al. | |
| 2023/0066893 | A1 | 3/2023 | Wang et al. | |
| 2023/0094985 | A1 | 3/2023 | Chu et al. | |
| 2023/0392925 | A1* | 12/2023 | Chu | G01B 11/272 |

* cited by examiner

MEASURING PARALLELISM

CROSS-REFERENCE TO RELATED APPLICATION

This application claims priority to and the benefit of Korean Patent Application No. 10-2023-0105891, filed in the Korean Intellectual Property Office on Aug. 11, 2023, the disclosure of which is incorporated herein by reference in its entirety.

BACKGROUND

In general, high-performance devices using semiconductor processes are implemented on wafers through various methods, such as wafer-based coating processes, exposure processes, development processes, etching processes, thin film processes, ion implantation processes, oxidation processes, and diffusion processes. These wafers are shaped into parts, such as semiconductors and memory chips, through packaging processes, such as dicing, die bonding, wire bonding, and molding.

In semiconductor processes, bonding generally refers to combining a wafer chip and a substrate, and different types of bonding include die bonding (or die attach), wire bonding, and flip chip bonding, which is a combination of the die bonding and the wire bonding that connects the chip and the substrate by forming a bump on a chip pad.

As pitch size decreases and bonding using bumps becomes physically impossible, direct bond interconnect (DBI), which removes bumps and attaches dies, is used. In hybrid bonding, which creates a direct bond activated by plasma at room temperature and uses heat to form a metal bond, copper wiring pads are directly attached to each other without bumps. Accordingly, electrical signal density can be increased by more than 1,000 times. Hybrid bonding generally includes wafer-to-wafer (W2W) bonding, die-to-die (D2D), and die-to-wafer (D2W) bonding methods, in which the D2W attaches a die to a wafer implementing flat and smooth surfaces of the two dies being joined together, which prevents connection failures that may occur if there is even a slight gap or unevenness between the joined surfaces.

In order to achieve a uniform surfaces that are flat and smooth, chemical mechanical polishing (CMP) is performed, and a process of inspection is performed before hybrid bonding through atomic force microscopy (AFM). Additionally, a parallelism measurement process is performed to ensure accurate alignment between the die and the wafer, whereby the parallelism between the die and the wafer can be controlled before bonding. However, conventional technology for measuring parallelism between a die and a wafer is influenced by a degree of tilt of the parallelism measurement apparatus itself, resulting in errors and low measurement sensitivity. In particular, with respect to optic configurations, it can be difficult to sufficiently manufacture bonded devices due to space considerations. Accordingly, there is a need to develop new parallelism measurement processes and technologies.

SUMMARY

In general, in some aspects, the present disclosure is directed to a parallelism measuring optical system module, a parallelism measuring device, and measuring method using the same having improved sensitivity to die-to-wafer measurements.

According to some aspects of the present disclosure, a parallelism measurement optical system module includes: a polarization beam splitter configured to separate incident light into reference light and measurement light, wherein the polarization beam splitter is configured to be positioned between a first specimen and a second specimen, a mirror positioned on a first surface of the polarization beam splitter and configured to reflect the reference light that has passed through the polarization beam splitter back to the polarization beam splitter, a first quarter wave plate positioned on a second surface of the polarization beam splitter that is perpendicular to the first surface, wherein the first quarter wave plate is arranged to change a polarization state of the measurement light reflected from the polarization beam splitter toward the first specimen, the first quarter wave plate being further arranged to change a polarization state of the measurement light reflected from the first specimen to provide first measurement light, and a second quarter wave plate positioned on a third surface of the polarization beam splitter that is perpendicular to the first surface and parallel to the second surface, wherein the second quarter wave plate is arranged to change a polarization state of the first measurement light that has passed through the first quarter wave plate toward the second specimen, and wherein the second quarter wave plate is arranged to change a polarization state of the first measurement light reflected from the second specimen to provide second measurement light.

According to some aspects of the present disclosure, a parallelism measurement optical system module includes: a polarization beam splitter configured to separate incident light incident from a light source into reference light and measurement light, wherein the polarization beam splitter is configured to be positioned between a first specimen and a second specimen, a mirror positioned on a first surface of the polarization beam splitter and configured to reflect the reference light that has passed through the polarization beam splitter back to the polarization beam splitter, a first quarter wave plate positioned on a second surface of the polarization beam splitter that is perpendicular to the first surface, wherein the first quarter wave plate is arranged to change a polarization state of the measurement light reflected from the polarization beam splitter toward the first specimen, the first quarter wave plate being further arranged to change a polarization state of the measurement light reflected from the first specimen to provide first measurement light, a second quarter wave plate positioned on a third surface of the polarization beam splitter that is perpendicular to the first surface and parallel to the second surface, wherein the second quarter wave plate is arranged to change a polarization state of the first measurement light that has passed through the first quarter wave plate toward the second specimen, and wherein the second quarter wave plate is arranged to change a polarization state of the first measurement light reflected from the second specimen to provide second measurement light, and wherein the measurement light reflected twice each from the first specimen and the second specimen passing through the first quarter wave plate and the second quarter wave plate is emitted with parallelism information of the first specimen and the second specimen, a determination module configured to determine parallelism of the first specimen and the second specimen using the emitted light.

DETAILED DESCRIPTION

Figure 1:
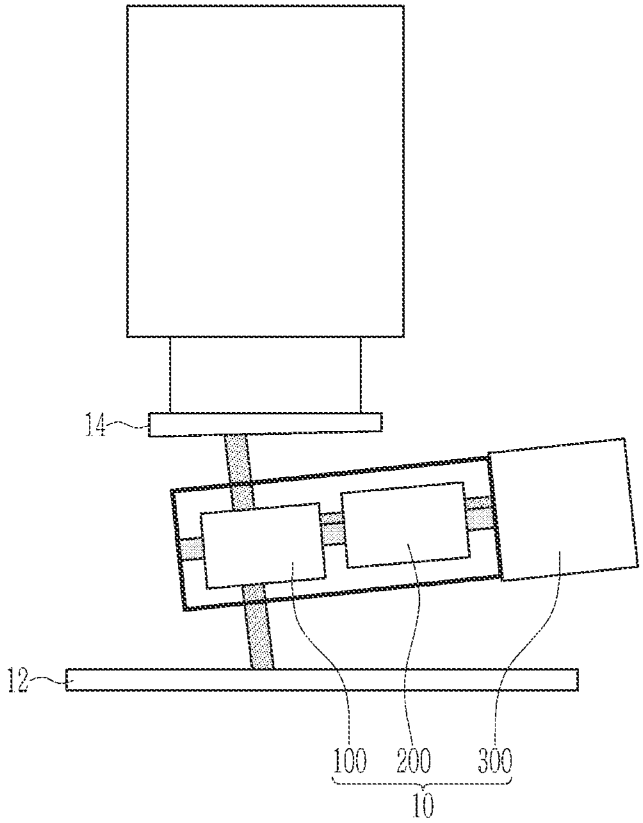
FIG. 1 illustrates an example of a parallelism measurement apparatus including a parallelism measurement optical system module according to some implementations.

Hereinafter, exemplary implementations will be described in detail with reference to the accompanying drawings. As those skilled in the art would realize, the described implementations may be modified in various different ways, all without departing from the spirit or scope of the present disclosure.

In the present disclosure, like numerals refer to like or similar constituent elements throughout the specification. Further, since sizes and thicknesses of constituent members shown in the accompanying drawings may not be to scale, the present disclosure is not limited to the illustrated sizes and thicknesses. In the drawings, the thicknesses of layers, films, panels, regions, etc., may be exaggerated for clarity, and for better understanding and ease of description, the thicknesses of some layers and areas may be shown to be exaggerated.

Throughout the present disclosure, an element that is described to be "coupled/connected" to another element, the element may be "directly coupled/connected" to the other element or "indirectly coupled/connected" to the other element through a third element. In addition, unless described to the contrary, the word "comprise" and variations such as "comprises" or "comprising" will be understood to imply the inclusion of stated elements but not the exclusion of any other elements.

In the present disclosure, when an element such as a layer, film, region, or substrate is referred to as being "on" another element, it may be directly on the other element or intervening elements may also be present. When an element is referred to as being "directly on" another element, there may be no intervening elements present. Further, the description of object(s) being "on" or "above" may be interpreted as meaning positioned on or below an object portion, and may not be necessarily interpreted as being positioned on the upper side of the object portion based on a gravitational direction.

Further, throughout the present disclosure, the phrase "in a plan view" may be interpreted to mean that when an object portion is viewed from above, and the phrase "in a cross-sectional view" may be interpreted to mean that when a cross-section taken by vertically cutting an object portion is viewed from the side.

FIG. 1 illustrates an exemplary parallelism measurement apparatus 10 according to some implementations. In FIG. 1, the parallelism measurement apparatus 10 may include an optical system module 200 configured to reflect light irradiated from a light source 100 into the optical system module 200 on a first specimen 12 and a second specimen 14, and emit the light having parallelism information of the first specimen 12 and the second specimen 14, and a determination module 300 configured to determine a degree of parallelism of the first specimen 12 and the second specimen 14 using light emitted from the optical system module 200.

The parallelism measurement apparatus 10 is positioned between the first specimen 12 and the second specimen 14 to measure the degree of parallelism between the first specimen 12 and the second specimen 14. In FIG. 1, the parallelism measurement apparatus 10 measures the degree of parallelism between a die attached to a lower end of a stage that is positioned above the parallelism measurement apparatus 10 and a wafer positioned below the parallelism measurement apparatus 10. In some implementations, the first specimen 12 may be a wafer, and the second specimen 14 may be a die. In some implementations, any two specimens for which the parallelism is to be measured may be used.

Figure 2:
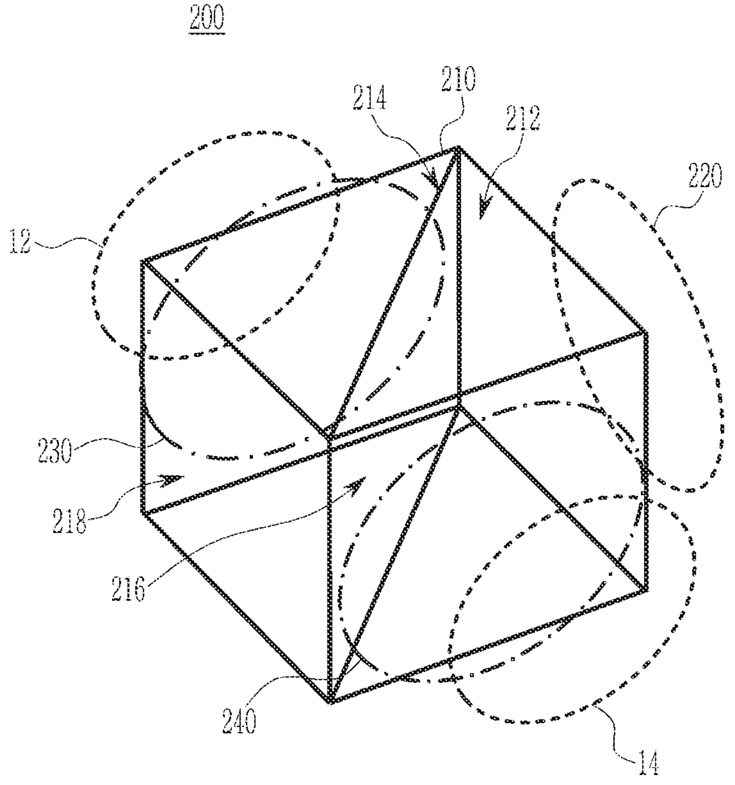
FIG. 2 illustrates an example of a parallelism measurement optical system module of FIG. 1 according to some implementations.
Figure 3:
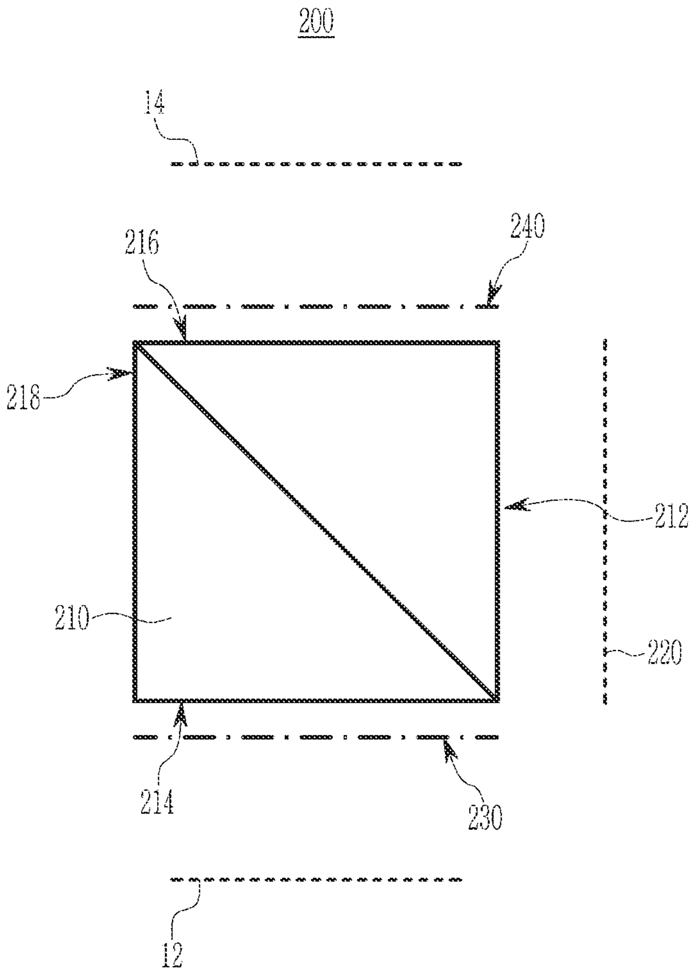
FIG. 3 illustrates a cross-section of the parallelism measurement optical system module in FIG. 2 according to some implementations.

FIG. 2 illustrates an exemplary parallelism measurement optical system module of the parallelism measurement apparatus of FIG. 1 according to some implementations, and FIG. 3 illustrates a cross-section of the parallelism measurement optical system module in FIG. 2 according to some implementations. In FIGS. 2 and 3, the parallelism measurement optical system module 200 may include a polarization beam splitter (PBS) 210 positioned between the first specimen 12 and the second specimen 14, and a mirror 220 including a first quarter wave plate (QWP) 230 and a second QWP 240 positioned between the PBS 210 and the first specimen 12 and the second specimen 14, and positioned in parallel at one side of the PBS 210 perpendicular to the first QWP 230 and the second QWP 240. The PBS 210 serves to divide incident light into two useful polarization modes by passing p-polarized light and reflecting s-polarized light through an internal tilted structure.

The first QWP 230 and the second QWP 240 serve to generate a quarter wave phase shift in transmitted light to change linearly polarized light into circularly polarized light, and vice versa. Here, the first QWP 230 and the second QWP 240 serve to change a polarization state of light reflected from the polarization beam splitter 210 and incident on the first QWP 230 and the second QWP 240.

Figure 4:
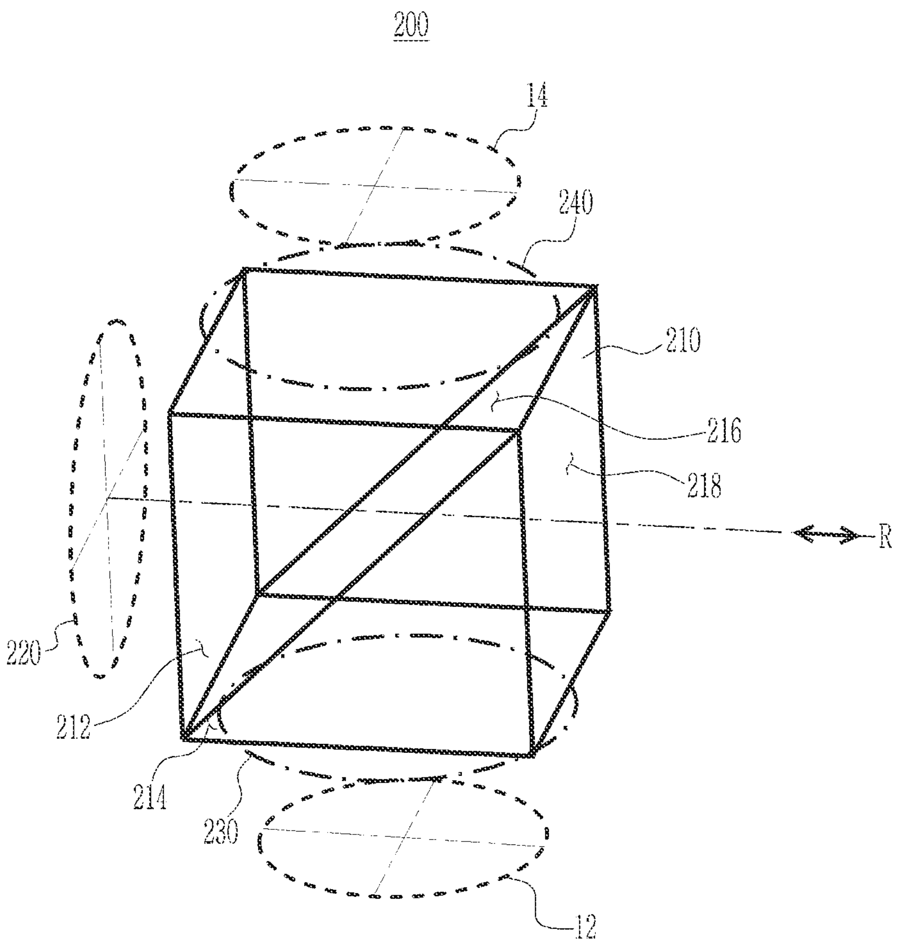
FIG. 4 illustrates an optical path of reference light separated from incident light that is incident on the parallelism measurement optical system module of FIG. 2 according to some implementations.
Figure 5:
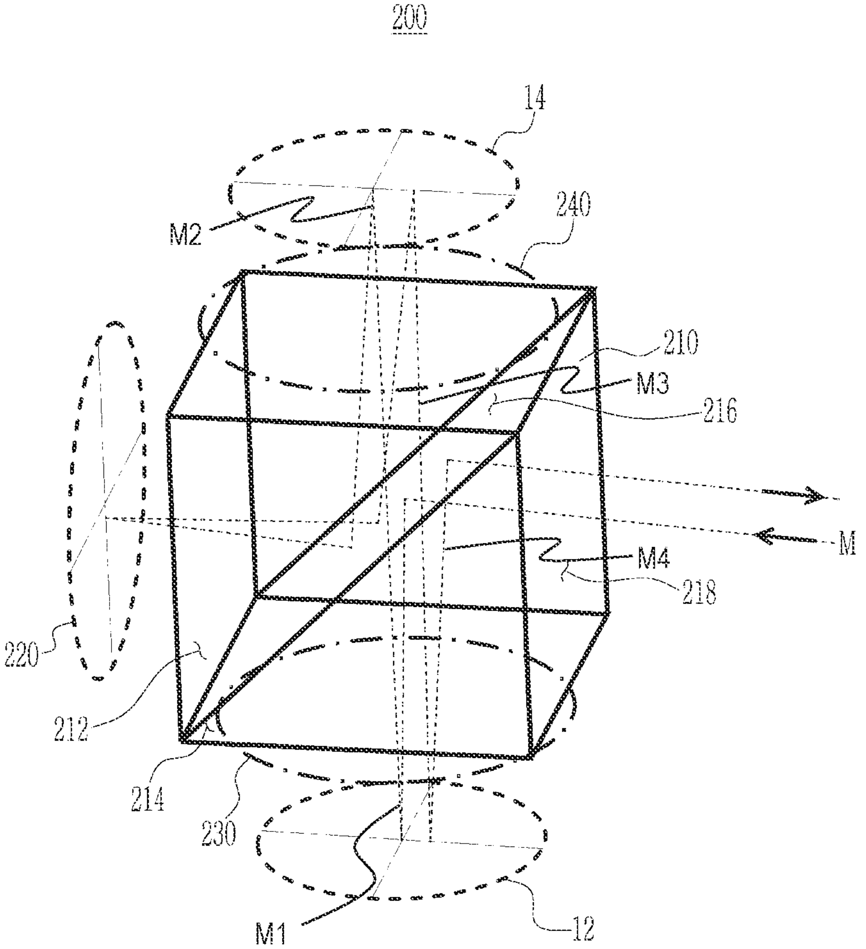
FIG. 5 illustrates an optical path of measurement light separated from incident light that is incident on the parallelism measurement optical system module of FIG. 2 according to some implementations.

FIG. 4 illustrates an optical path of reference light R separated from incident light that is incident on the parallelism measurement optical system module 200 of FIG. 2 in some implementations. FIG. 5 illustrates an optical path of measurement light M separated from the incident light that is incident on the parallelism measurement optical system module 200 of FIG. 2 in some implementations.

As illustrated in FIG. 4, among the incident light incident on the optical system module 200, p-polarized light may become the reference light R, and the reference light R may pass through the PBS 210 and proceed straight. Then the reference light R may be reflected and emitted from the mirror 220 positioned on a first surface 212 of the PBS 210.

The first surface 212 of the PBS 210 refers to the surface facing a direction in which light is incident, and among surfaces positioned to be vertical and adjacent to the first surface 212. The surface positioned close to the first specimen 12 is defined as a second surface 214 of the PBS 210. The surface positioned close to the second specimen 14 is defined as a third surface 216. The surface positioned parallel to the first surface 212 is defined as a fourth surface 218. The reference light R among the incident light is not reflected by the PBS 210, but is reflected by the facing mirror 220, and is emitted again toward a direction in which it was incident, as illustrated in FIG. 4. As illustrated in FIG. 5, among the incident light, s-polarized light, which becomes the measurement light M, may be reflected from a tilted surface of the PBS 210 to be reflected twice, each upon the first specimen 12 and the second specimen 14. Specifically, the incident measurement light M is s-polarized and is reflected by the PBS 210 and may be incident toward the first quarter wave plate 230 positioned on the second surface 214 of the PBS 210. The first quarter wave plate 230 may change a polarization state, and the measurement light M (s-polarized light) reflected from the PBS 210 may be changed into circularly polarized light while passing through the first QWP 230.

The measurement light M passing through the first QWP 230 may be reflected upon the surface of the first specimen 12 to pass through the first QWP 230 again, and while passing through the first QWP 230, the measurement light M may be changed to p-polarized light. Herein, the measurement light M changed to p-polarized light is defined as a first measurement light M1 that is reflected on a surface of the first specimen 12, and has information related to the surface of the first specimen 12. The first measurement light M1 (p-polarized light) may pass through the PBS 210 and be directed toward the third surface 216 facing the second surface 214, and may be changed back to circularly polarized light as it passes through the second QWP 240 positioned at the third surface 216.

The measurement light M, which passes through the second QWP 240, is reflected upon a surface of the second specimen 14, and passes through the second QWP 240 again, is changed to s-polarized light by the second QWP 240. As discussed herein, the measurement light M also has information related to the surface of the second specimen 14 and is referred to as a second measurement light M2.

The second measurement light M2 (s-polarized light) passing through the second QWP 240 is reflected from the PBS 210 and directed toward the mirror 220. The second measurement light M2 (s-polarized light) that is reflected from the mirror 220 is reflected again from the PBS 210 and passes through the second QWP 240 toward the third surface 216, and is reflected again onto the surface of the second specimen 14 and changes into a third measurement light M3 (p-polarized light) while passing through the second QWP 240.

The third measurement light M3 (p-polarized light) passes through the PBS 210 without being reflected therefrom, to pass through the first QWP 230 toward the second surface 214, and is reflected again onto the surface of the first specimen 12 to change into a fourth measurement light M4 (s-polarized light) while passing through the first QWP 230 again.

According to the above-described path, the fourth measurement light M4 is light reflected twice each from the first specimen 12 and the second specimen 14, and has parallelism information of the first specimen 12 and the second specimen 14, and the fourth measurement light M4 (s-polarized) is reflected by the PBS 210 to be emitted in a same direction as an incident direction, that is, toward the fourth surface 218 of the PBS 210.

In some implementations, the parallelism measurement optical system module 200 may include the PBS 210 that separates the incident light into reference light R and the measurement light M (s-polarized light), and the mirror 220 positioned on the first surface 212 of the PBS 210 and reflecting the reference light R that has passed through the PBS 210 back to the PBS 210. Additionally, the parallelism measurement optical system module 200 may include the first QWP 230 positioned on the second surface 214 perpendicular to the first surface 212 of the PBS 210 to change a polarization state of the measurement light M (s-polarized light) reflected from the PBS 210 to circularly polarized light, and the second QWP 240 positioned on the third surface 216 of the PBS 210, which is perpendicular to the first surface 212 and parallel to the second surface 214, and to change polarized light of the first measurement light M1 (p-polarized light) that is reflected upon the surface of the first specimen 12, passes through the first QWP 230, and is re-incident to the PBS 210 to be circularly polarized light.

Figure 6A:
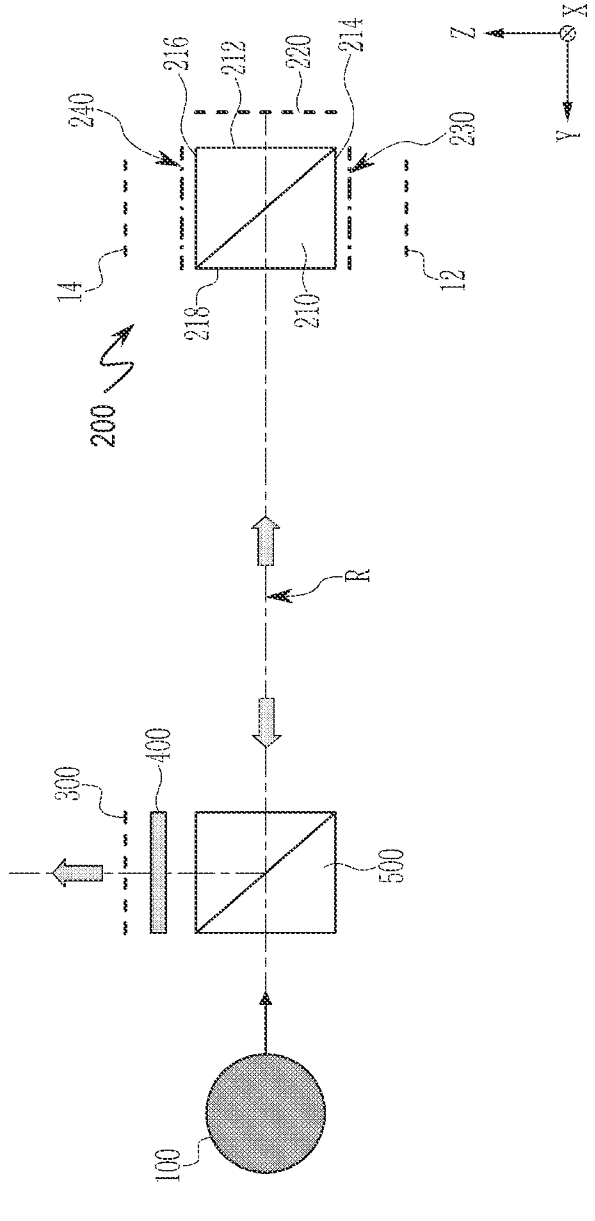
FIG. 6A illustrates an optical path of reference light separated from incident light that is incident on the parallelism measurement optical system module according to some implementations.
Figure 6B:
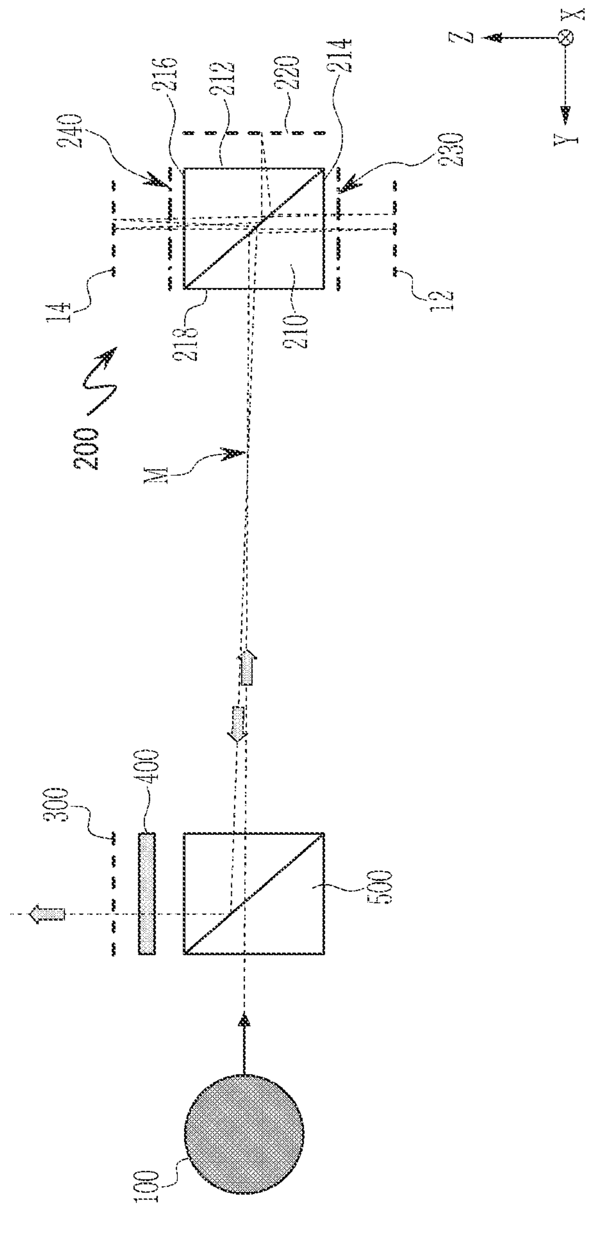
FIG. 6B illustrates an optical path of measurement light separated from incident light that is incident on the parallelism measurement optical system module according to some implementations.
Figure 7:
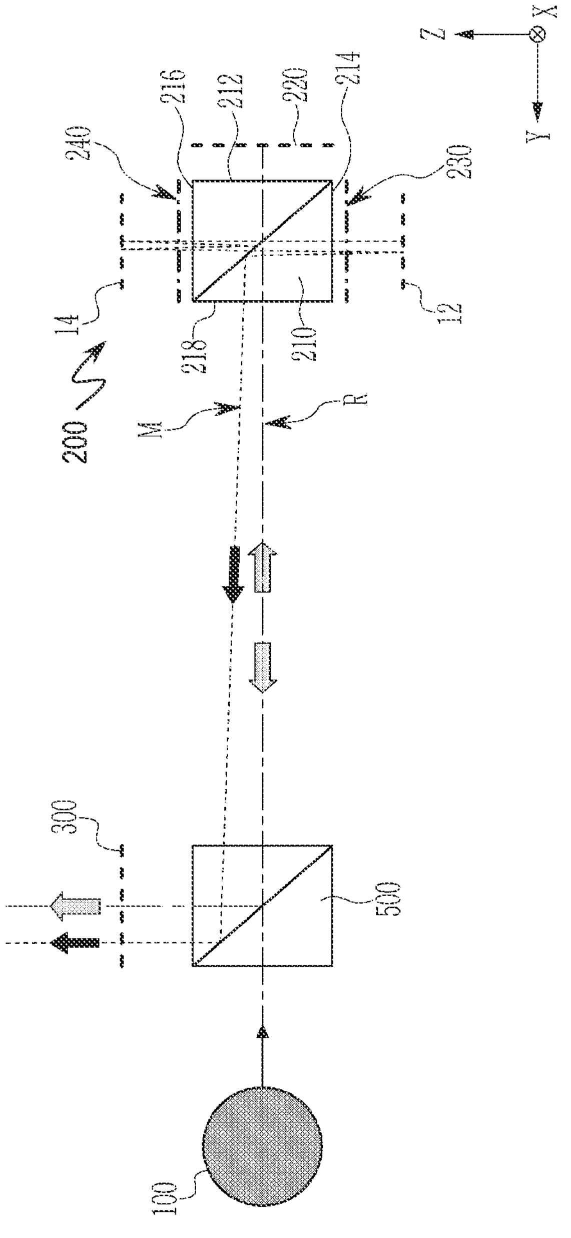
FIG. 7 illustrates an optical path of light that is incident on a tilted parallelism measurement optical system module according to some implementations.

FIGS. 6A, 6B, and 7 illustrate the parallelism measurement optical system module according to another implementation.

FIG. 6A illustrates an optical path of reference light separated from incident light that is incident on the parallelism measurement optical system module according to some implementations. FIG. 6B illustrates an optical path of measurement light separated from incident light that is incident on the parallelism measurement optical system module according to some implementations. FIG. 7 illustrates an optical path of light that is incident on a tilted the parallelism measurement optical system module according to some implementations.

In FIGS. 6A and 6B, the parallelism measurement optical system module 200 separates the incident light incident from the light source 100 into the reference light R and the measurement light M, and sequentially makes it incident upon the surface of the first specimen 12 and the surface of the second specimen 14 by using the PBS 210, the QWPs 230 and 240, and the mirror 220. Accordingly, the degree of parallelism between the surface of the first specimen 12 and the surface of the second specimen 14 may be measures by analyzing an interference image created by interfering with the reference light R, in which the measurement light M is reflected twice each upon the surface of the first specimen 12 and the second specimen 14.

The parallelism measurement optical system module 200 shown in FIGS. 6A, 6B, and 7 may be a form of the parallelism measurement optical system module 200 shown in FIGS. 2 to 5 that further includes a determination module 300. That is, the parallelism measurement optical system module 200 shown in FIGS. 6A, 6B, and 7 includes a polarizing beam splitter 210, quarter wave plates 230 and 240, a mirror 220, and a determination module 300.

In FIG. 6A, FIG. 6B, and FIG. 7, an optical path in the parallelism measurement optical system module 200. In particular, FIG. 6A and FIG. 6B each illustrate the optical path in the non-tilted the parallelism measurement optical system module 200, in which FIG. 6A illustrates only a path of the reference light R in the parallelism measurement optical system module 200, and FIG. 6B illustrates only a path of the measurement light M. FIG. 7 illustrates an implementation in which the optical system module 200 does not affect the measurement of parallelism of the first and second specimens in a tilted state, and unlike in FIG. 6, FIG. 7 shows the entire optical path when the optical system module 200 is tilted.

In some implementations, the parallelism measurement optical system module 200 separates the irradiated light into the reference light R and the measurement light M, reflects the measurement light M twice each on the first specimen 12 and the second specimen 14 to emit parallelism information, and the parallelism measurement optical system module 200 may include the determination module 300 configured to determine a degree of parallelism of the first specimen 12 and the second specimen 14 using light emitted from the optical system module 200.

The incident light incident from the light source 100 may be converted into parallel light through a collimating lens to be light beam having an area. The incident light may have linearly polarized light rotated by 45 degrees with respect to the incident y-axis, and the parallel light may have a diameter of several to tens of millimeters (mm), but it may be changed to a specific angle according to an amount of reflected light.

In addition, the first QWP 230 and the second QWP 240 are positioned on the second surface 214 and the third surface 216, respectively, of the PBS 210, and may be positioned in a state of being rotated 45 degrees in the x and y planes to delay phases of passing light by 45 degrees.

In addition, as illustrated in FIGS. 6A and 6B the parallelism measurement optical system module 200 may position a beam splitter 500 between the light source 100 and the PBS 210, and may install a linear polarizer 400 rotated by 45 degrees on the x and y planes at a position where it is reflected from the beam splitter 500. Light rotated by 45 degrees by the linear polarizer 400 may be incident on the determination module 300, and the determination module 300 may be configured to determine the degree of parallelism of the first specimen 12 and the second specimen 14 using the incident light.

In FIG. 7, the parallelism measurement optical system module 200 may be positioned in a tilted state. It may be seen that tilting of the optical system module 200 may not affect parallelism measurement values of the first specimen 12 and the second specimen 14.

A path of light incident from the light source 100 and a path of light emitted from the PBS 210 extend through the fourth surface 218 parallel to the first surface 212 of the PBS 210. Light incident on the tilted optical system module 200, that is, both the reference light R and the measurement light M, are emitted through the fourth surface 218. The emitted light passes through the beam splitter 500 positioned between the polarization beam splitter 210 and the light source 100, and is directed in one direction where the determination module 300 is positioned, and as shown in FIG. 4 to FIG. 7. Even if an interference image is measured while the optical system module 200 is tilted, there is no change in a relative angle between the reference light R and the measurement light M. That is, an interval of an interference pattern is determined by the angle between lights, and even if the parallelism measurement optical system module 200 is tilted, and measurement of parallelism of the first specimen 12 and the second specimen 14 is not affected.

In the optical paths shown in FIGS. 6A, 6B, and 7, the parallelism measurement optical system module 200 may include the PBS 210 that separates light incident from the light source 100 into the reference light R and the measurement light M (s-polarized light). The mirror 220 is positioned on the first surface 212 of the PBS 210 and reflects the reference light R passing through the PBS 210 to the PBS 210, the first QWP 230 that is positioned on the second surface 214 adjacent to the first surface 212 of the PBS 210 and changes a polarization state of the measurement light M (s-polarized light) reflected from the PBS 210 to the first measurement light M1 (p-polarized light), and the second QWP 240 that is positioned on the third surface 216 parallel to the second surface 214 of the PBS 210 and changes a polarization state of the first measurement light M1 (p-polarized light).

The first QWP 230 and the second QWP 240 may be positioned by rotating 45 degrees to delay a phase of light passing therethrough by 45 degrees, and the linear polarizer 400, which interferes with the reference light R and the measurement light M reflected from the beam splitter 500, may be rotated by 45 degrees and positioned to cause emitted lights to interfere with each other.

Referring to a path of the reference light R in FIG. 6A, among the incident light, p-polarized light passes through the PBS 210, is reflected on the mirror 220 positioned on the first surface 212 of the PBS 210, and again passes through the PBS 210 and is reflected on the beam splitter 500, and passes through the linear polarizer 400 before being incident on the determination module 300 and then proceeds to the determination module 300.

Referring to a path of the measurement light M illustrated in FIG. 6B, among the incident light, s-polarized light may be the measurement light M, may be reflected from the PBS 210, and may pass through the first QWP 230 positioned on the second surface 214 of the PBS 210, and may be reflected from the first specimen 12, such as a wafer in some implementations, positioned at a lower portion.

The reflected measurement light M may pass through the first QWP 230 again and may be changed to p-polarized light (the first measurement light M1) may pass through the PBS 210 to pass through the second QWP 240 positioned on the third surface 216 of the PBS 210 and to be reflected onto the second specimen 14, such as a die in some implementations, positioned at an upper portion.

The second measurement light M2, which, in some implementations is reflected by the die and passes through the second QWP 240, may be s-polarized, may not pass through the PBS 210, and may be reflected in the direction of the first surface 212, to be reflected on the mirror 220 positioned on the first surface 212 of the PBS 210.

The second measurement light M2 reflected from the mirror 220 may again pass through the second QWP 240 positioned on the third surface 216 of the PBS 210. Then, the second measurement light M2 is reflected by the second specimen 14, and may become the third measurement light M3, which is p-polarized after passing through the second QWP 240 once more. Next, the third measurement light M3 may pass through the PBS 210 and pass through the first QWP 230 positioned on the first surface 212 of the PBS 210. Then, the third measurement light M3 may be reflected by the first specimen 12 and pass through the first QWP 230 again, and may ultimately become the fourth measurement light M4, which is s-polarized.

Finally, the fourth measurement light M4 (s-polarized light) is reflected from the polarization beam splitter 210 and directed toward the fourth surface 218, and is reflected from the beam splitter 500 positioned between the light source 100 and the polarization beam splitter 210 to be incident on the determination module 300.

In the optical system module 200, the first measurement light M1 (p-polarized light) may be reflected onto the surface of the second specimen 14, pass through a second QWP 240, and change into second measurement light M2 (s-polarized light). Then, the second measurement light M2 (s-polarized light) may be sequentially reflected by the PBS 210, the mirror 220, and the PBS 210 and reflected again from the surface of the second specimen 14 and change into the third measurement light M3 (p-polarized light) while passing through the second QWP 240. Next, the third measurement light M3 (p-polarized light) may pass through the PBS 210 and be reflected back from the surface of the first specimen 12 to change into the fourth measurement light M4 (s-polarized light) while passing through the first QWP 230, and the fourth measurement light M4 (s-polarized light) may be reflected by the PBS 210 to be directed toward the light source 100.

Among light irradiated from the light source 100, p-polarized light becomes the reference light R, and s-polarized light is reflected twice each from the first specimen 12 and the second specimen 14 positioned at upper and lower portions. According, in the process, information related to parallelism of the first specimen 12 and the second specimen 14 is obtained.

In some implementations, the beam splitter 500 through which the reference light R and the measurement light M pass before being incident on the determination module 300 may be included in the determination module 300, and a linear polarizer 400 may also be included in the decision module 300. However, in some implementations, the beam splitter 500 and the linear polarizer 400 may be configured separately from the determination module 300.

The determination module 300 may include at least one of an image sensor that is configured to detect the parallelism of the first specimen 12 and the second specimen 14 through interference images by the reference light R and the measurement light M, or may include a wavefront sensor that is configured to detect the parallelism of the first specimen 12 and the second specimen 14 using an incident angle of the measurement light M. For example, if the light emitted from the light source 100 is coherent light, a tilt between the first specimen 12 and the second specimen 14 may be analyzed with an interference image using an image sensor. If a mutual inclination degree of the first specimen 12 and the second specimen 14 is large, a large number of stripes appear in the interference image, and a direction of the stripes indicates a tilted direction. In some implementations, the interference image will be described with reference to FIG. 8A to FIG. 8D below.

In some implementations, if the light emitted from the light source 100 is non-coherent light, a tilted wavefront is directly measured using a wavefront sensor, and a degree of parallelism between the first specimen 12 and the second specimen 14 may be measured.

Figure 8A:
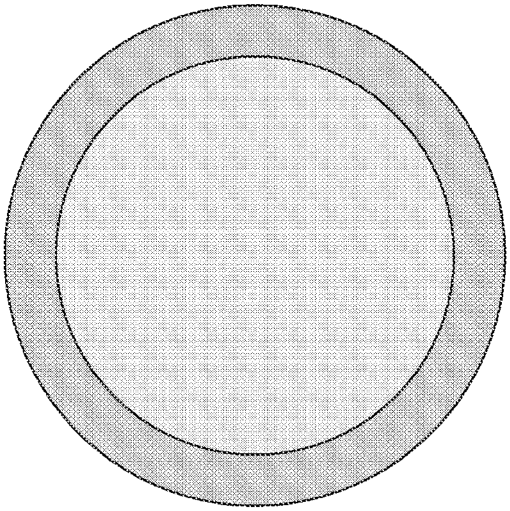
FIG. 8A to FIG. 8D each illustrate an interference pattern measured by a determination module of the parallelism measurement optical system module according to some implementations.
Figure 8B:
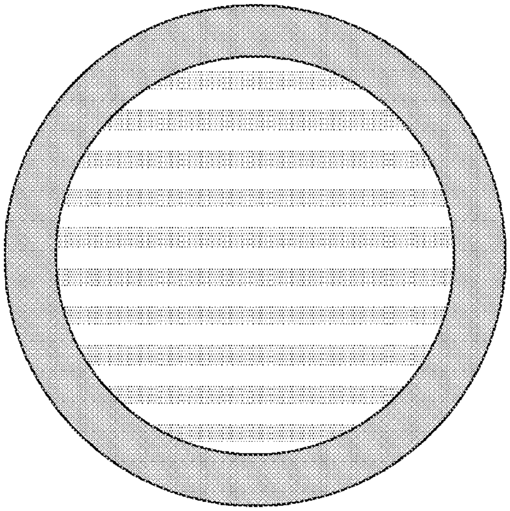
Figure 8C:
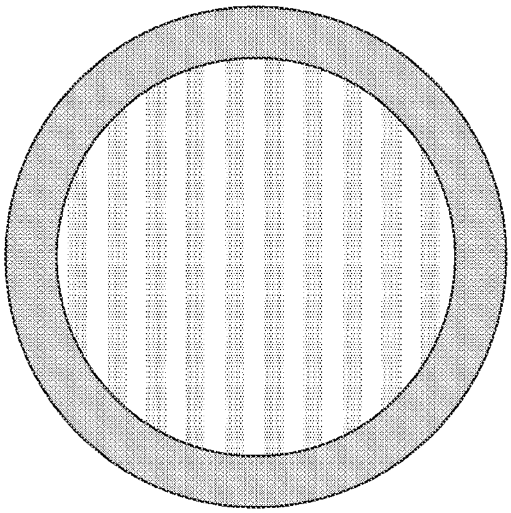
Figure 8D:
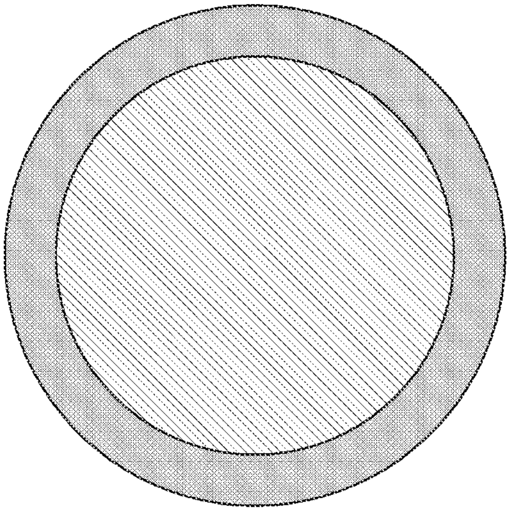

FIG. 8A to 8D illustrate interference patterns measured by the determination module 300 of the parallelism measurement optical system module 200 according to some implementations. In FIG. 8A to FIG. 8D, the light emitted from the light source 100 is coherent light. FIG. 8A illustrates the measurement of parallelism between the first specimen 12 and the second specimen 14 after the optical system module 200 is placed between the first specimen 12 and the second specimen 14 in a state in which neither the first specimen 12 nor the second specimen 14 is tilted. FIG. 8B illustrates parallelism measured in a state where the second specimen 14 was tilted 0.01 degrees in an x-axis direction. FIG. 8C illustrates measurements made in a state where the first specimen 12 was tilted by 0.01 degrees in a y-axis direction. No interference pattern appears in FIG. 8A, in a state where the first specimen 12 and the second specimen 14 are parallel to each other, and different interference patterns appear depending on the state in FIG. 8B, FIG. 8C, and FIG. 8D, in a state where they are tilted. FIG. 8B and FIG. 8C show an implementation where tilt angles are the same at 0.01 degrees and each direction is different, which show that distances of stripes in an interference image are the same and the directions are different. FIG. 8D shows an interference image measured with the second specimen 14 tilted by 0.1 degrees on an x-axis and the first specimen 12 tilted by 0.01 degrees on a y-axis, that is, stripes detected by an image sensor. The stripes shown in FIG. 8D are depicted to be more closely spaced than the stripes depicted in FIG. 8B or FIG. 8C, and the directions of the stripes are also oriented diagonally, indicating that the degree of inclination between the first specimen 12 and the second specimen 14 in FIG. 8D is greater than that in FIG. 8B and FIG. 8C, and the directions are tilted in a diagonal direction. As shown in FIG. 8A to FIG. 8D, the directions of the stripes in the interference image indicate tilt angles, and the distances of the stripes indicate the degree of inclination. The determination module 300 may measure the degree and direction of inclination, i.e., the degree of parallelism, of the first specimen 12 and the second specimen 14 through interference image analysis.

In some implementations, a measurement range and resolution in the determination module 300 may change depending on a pixel size of a sensor used and a magnitude of incident and reflected light, and it may be possible to have a measurement range of approximately −0.5 to +0.5 degrees and a measurement resolution of 0.0001 degrees, thereby improving the sensitivity by about 2 times compared to the prior art. For example, it may be seen that the measurement sensitivity is improved by about two times because a number of stripes in the interference image for same 0.01 degrees appears twice as much.

Figure 9:
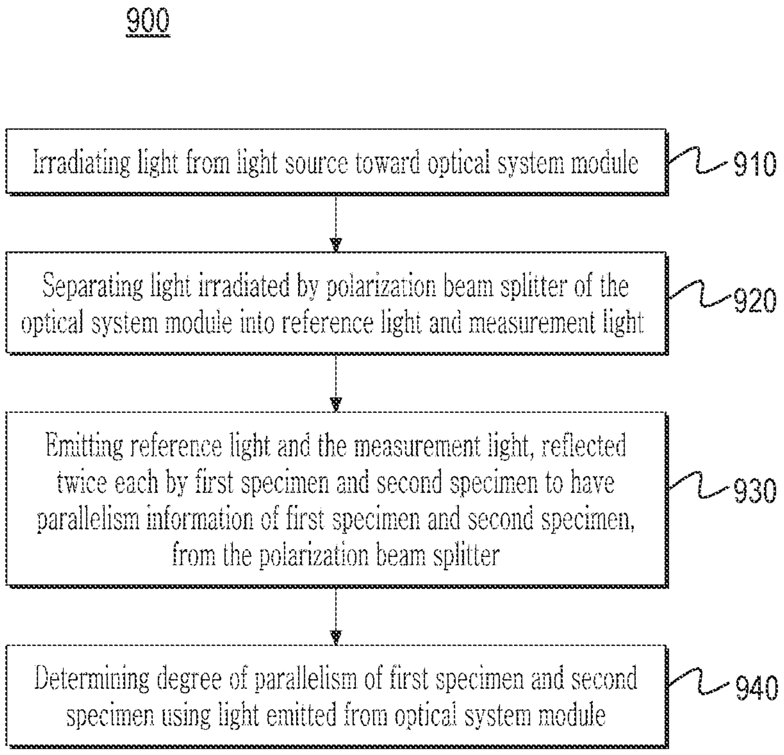
FIG. 9 illustrates a view for describing an exemplary parallelism measurement method using the parallelism measurement optical system module according to some implementations.

FIG. 9 illustrates an exemplary parallelism measurement method using the parallelism measurement optical system module 200 according to some implementations. In FIG. 9, the parallelism measurement method 900 using the parallelism measurement optical system module 200 may include irradiating light from the light source 100 toward the optical system module 200 (910), separating the light irradiated by the polarization beam splitter 210 of the optical system module 200 into reference light R and measurement light M (920), emitting the reference light R and the measurement light M, reflected twice each by the first specimen 12 and the second specimen 14 to have parallelism information of the first specimen 12 and the second specimen 14, from the PBS 210 (930), and determining a degree of parallelism of the first specimen 12 and the second specimen 14 using light emitted from the PBS 210 (940).

The beam splitter 500 positioned between the light source 100 and the PBS 210 may serve to reflect the reference light R and the measurement light M emitted from the PBS 210 in a direction in which the determination module 300 is positioned.

In some implementations, determining the degree of parallelism (940) may include allowing the reference light R and the measurement light M to enter an image sensor by the beam splitter 500, and determining the degree of parallelism by analyzing an interference image by the image sensor by an analyzer. The analyzer may analyze a mutual tilt degree and directions of the first specimen 12 and the second specimen 14 through distances and directions of the stripes of the interference image by the image sensor.

In some implementations, determining of the degree of parallelism (940) may include allowing the measurement light M to be incident on a wavefront sensor by the beam splitter 500, and determining the degree of parallelism of the first specimen 12 and the second specimen 14 by analyzing an incident angle of the measurement light M using the wavefront sensor.

In some implementations, a path incident from the light source 100 and a path emitted from the polarization beam splitter 210 of the optical system module 200 pass through a fourth side 218 parallel to the first side 212 of the polarization beam splitter 210. A structure of the optical system module 200 may be simplified while efficiently utilizing the internal space of the optical system module 200 by integrating a path where light enters and exits.

Additionally, a structure of the optical system module 200 formed to include a PBS 210, first and second QWPs 230 and 240, and the mirror 220 may allow the measurement light M to reflect twice each on the first and second specimens 12 and 14, enabling measurement with twice the sensitivity compared to a measurement method by which measurement light reflected once. In addition, by minimizing the optical path through reflection, reflection with other components, and reducing a size of the optical system module 200, the parallelism measurement apparatus 10 including the optical system module 200 may be miniaturized.

In addition, lights R and M emitted through the fourth surface 218 are incident on the determination module 300 through the beam splitter 500, and light incident on the tilted optical system module 200 also passes through the optical system module 200 and the beam splitter 500 and is ultimately directed in the direction where the determination module 300 is positioned, and as may be seen in FIG. 4 to FIG. 7. Even if an interference image is measured while the optical system module 200 is tilted, there is no change in a relative angle between the reference light R and the measurement light M. In some implementations, an interval of an interference pattern is determined by the angle between lights, and even if the parallelism measuring apparatus 10 is tilted, this does not affect measurement of parallelism of the first specimen 12 and the second specimen 14.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

What is claimed is:

1. A parallelism measurement optical system module comprising:

a polarization beam splitter configured to separate incident light into reference light and measurement light, wherein the polarization beam splitter is configured to be positioned between a first specimen and a second specimen;

a mirror positioned on a first surface of the polarization beam splitter and configured to reflect the reference light that has passed through the polarization beam splitter back to the polarization beam splitter;

a first quarter wave plate positioned on a second surface of the polarization beam splitter that is perpendicular to the first surface, wherein the first quarter wave plate is arranged to change a polarization state of the measurement light reflected from the polarization beam splitter toward the first specimen, the first quarter wave plate being further arranged to change a polarization state of the measurement light reflected from the first specimen to provide first measurement light; and a second quarter wave plate positioned on a third surface of the polarization beam splitter that is perpendicular to the first surface and parallel to the second surface, wherein the second quarter wave plate is arranged to change a polarization state of the first measurement light that has passed through the first quarter wave plate toward the second specimen, and wherein the second quarter wave plate is arranged to change a polarization state of the first measurement light reflected from the second specimen to provide second measurement light.

2. The parallelism measurement optical system module of claim 1, wherein the first quarter wave plate and the second quarter wave plate are rotated and positioned to delay a phase of passing light.

3. The parallelism measurement optical system module of claim 1, wherein the second measurement light is changed into third measurement light by a second reflection from the surface of the second specimen and multiple passes through the second quarter wave plate, and wherein the third measurement light is changed into fourth measurement light by a second reflection from the surface of the first specimen, and multiple passes through the first quarter wave plate.

4. The parallelism measurement optical system module of claim 3, wherein the second measurement light passing through the second quarter wave plate is changed into the third measurement light through the following sequence: reflection from the polarization beam splitter toward the mirror, reflection from the mirror toward the polarization beam splitter, reflection from the polarization beam splitter toward the second quarter wave plate, transmission through the second quarter wave plate toward the second specimen, reflection from the surface of the second specimen, and transmission through the second quarter wave plate.

5. The parallelism measurement optical system module of claim 3, wherein the fourth measurement light is reflected from the polarization beam splitter toward a fourth surface of the polarization beam splitter that is parallel to the first surface of the polarization beam splitter.

6. The parallelism measurement optical system module of claim 1, wherein the reference light is p-polarized light, and the measurement light is s-polarized light.

7. The parallelism measurement optical system module of claim 1, wherein the first quarter wave plate and the second quarter wave plate delay a light phase by 45 degrees.

8. The parallelism measurement optical system module of claim 1, wherein the measurement light reflected from the first specimen and the second specimen passing through the first quarter wave plate and the second quarter wave plate has parallelism information of the first specimen and the second specimen.

9. A parallelism measurement optical system module comprising:

a polarization beam splitter configured to separate incident light incident from a light source into reference light and measurement light, wherein the polarization beam splitter is configured to be positioned between a first specimen and a second specimen;

a mirror positioned on a first surface of the polarization beam splitter and configured to reflect the reference light that has passed through the polarization beam splitter back to the polarization beam splitter;

a first quarter wave plate positioned on a second surface of the polarization beam splitter that is perpendicular to the first surface, wherein the first quarter wave plate is arranged to change a polarization state of the measurement light reflected from the polarization beam splitter toward the first specimen, the first quarter wave plate being further arranged to change a polarization state of the measurement light reflected from the first specimen to provide first measurement light;

a second quarter wave plate positioned on a third surface of the polarization beam splitter that is perpendicular to the first surface and parallel to the second surface, wherein the second quarter wave plate is arranged to change a polarization state of the first measurement light that has passed through the first quarter wave plate toward the second specimen, and wherein the second quarter wave plate is arranged to change a polarization state of the first measurement light reflected from the second specimen to provide second measurement light; and wherein the measurement light reflected twice each from the first specimen and the second specimen passing through the first quarter wave plate and the second quarter wave plate is emitted with parallelism information of the first specimen and the second specimen, a determination module configured to determine parallelism of the first specimen and the second specimen using the emitted light.

10. The parallelism measurement optical system module of claim 9, wherein the second measurement light is changed into third measurement light by a second reflection from the surface of the second specimen and multiple passes through the second quarter wave plate, and wherein the third measurement light is changed into fourth measurement light by a second reflection from the surface of the first specimen, and multiple passes through the first quarter wave plate.

11. The parallelism measurement optical system module of claim 10, wherein the fourth measurement light is reflected from the polarization beam splitter toward a fourth surface of the polarization beam splitter that is parallel to the first surface of the polarization beam splitter.

12. The parallelism measurement optical system module of claim 9, wherein the determination module includes:

a beam splitter positioned between the light source and the polarization beam splitter to reflect the reference light and the measurement light emitted from the optical system module in a direction.

13. The parallelism measurement optical system module of claim 12, wherein the determination module includes:

a linear polarizer configured to allow interference between the reflected reference light and the measurement light.

14. The parallelism measurement optical system module of claim 13, wherein the determination module includes:

an image sensor configured to detect the parallelism of the first specimen and the second specimen through an interference image by the reference light and the measurement light.

15. The parallelism measurement optical system module of claim 9, wherein the determination module includes:

a wavefront sensor configured to detect the parallelism of the first specimen and the second specimen using an incident angle of the measurement light.

16. The parallelism measurement optical system module of claim 9, wherein light incident from the light source is collimated.

17. The parallelism measurement optical system module of claim 9, wherein the reference light is p-polarized light, and the measurement light is s-polarized light.

18. The parallelism measurement optical system module of claim 9, wherein the first quarter wave plate and the second quarter wave plate are rotated by 45 degrees and positioned to delay a phase of passing light by 45 degrees.

19. The parallelism measurement optical system module of claim 9, wherein the light source is parallel light polarized at 45 degrees.

20. The parallelism measurement optical system module of claim 9, wherein the determination module includes a linear polarizer and a beam splitter, and wherein the linear polarizer is configured to allow interference between the reference light and the measurement light reflected from the beam splitter, the beam splitter being configured to reflect the reference light and the measurement light emitted from the optical system module in a direction to interfere, the linear polarizer being rotated by 45 degrees and positioned in a light path of light reflected from the beam splitter.

* * * * *